United States Patent
Roth et al.

(10) Patent No.: US 9,122,004 B1
(45) Date of Patent: Sep. 1, 2015

(54) HETEROGENEOUS RESONANT PHOTONIC INTEGRATED CIRCUIT

(75) Inventors: Jonathan E. Roth, Santa Barbara, CA (US); Brian Koch, San Carlos, CA (US)

(73) Assignee: Aurrion, Inc., Goleta, CA (US)

(*) Notice: Subject to any disclaimer, the term of this patent is extended or adjusted under 35 U.S.C. 154(b) by 416 days.

(21) Appl. No.: 13/546,822

(22) Filed: Jul. 11, 2012

(51) Int. Cl.
*G02F 1/035* (2006.01)
*G02B 6/12* (2006.01)
*G02B 6/26* (2006.01)
*G02B 6/42* (2006.01)
*G02B 6/122* (2006.01)
*G02F 1/01* (2006.01)
*G02B 6/43* (2006.01)

(52) U.S. Cl.
CPC ............ *G02B 6/12004* (2013.01); *G02B 6/122* (2013.01); *G02B 6/12007* (2013.01); *G02F 1/011* (2013.01); *G02F 1/0102* (2013.01); *G02F 1/035* (2013.01); *G02B 6/43* (2013.01)

(58) Field of Classification Search
CPC ...... G02B 6/43; G02B 6/122; G02B 6/12004; G02B 6/12007; G02F 1/3132; G02F 2203/50; G02F 1/00; G02F 1/01; G02F 1/011; G02F 1/0102; G02F 1/035; H01S 3/0604; H01S 3/0627
USPC ........... 385/2, 3, 9, 14–15, 50, 27–28, 31–32, 385/39–42, 122; 372/7
See application file for complete search history.

(56) References Cited

U.S. PATENT DOCUMENTS

| 8,213,751 B1* | 7/2012 | Ho et al. ................... 385/14 |
| 2008/0001062 A1* | 1/2008 | Gunn et al. ................. 250/206 |
| 2008/0002929 A1* | 1/2008 | Bowers et al. .............. 385/15 |

* cited by examiner

*Primary Examiner* — Akm Enayet Ullah
*Assistant Examiner* — Michael Mooney
(74) *Attorney, Agent, or Firm* — Schwegman Lundberg & Woessner, P.A.

(57) ABSTRACT

Embodiments of the invention describe a modulator material heterogeneous-bonded over a resonator structure in a photonic integrated circuit (PIC) to create a resonance-enhanced modulator. The resulting structure may utilize optimal materials and optimized fabrication processes to create a device with the desired properties. Materials and processes used may combine advantages such as high index contrast, low propagation loss, small resonator volume, efficient modulation combined with desired linearity or nonlinearity, and precisely fabricated evanescent and interferometric couplers. The materials can be combined flexibly to create a resonator with a wide range of Free Spectral Range (FSR), cavity Q-factor, and modulation efficiency, allowing for resonance enhanced modulators to be designed optimally for a range of requirements. Heterogeneous integration allows dense integration in a PIC with silicon passives and various heterogeneous-enabled devices such as other modulators, detectors, semiconductor optical amplifiers (SOAs), and lasers.

26 Claims, 8 Drawing Sheets

HETEROGENEOUS RESONANT PHOTONIC INTEGRATED CIRCUIT

FIELD

Embodiments of the invention generally pertain to optical devices and more specifically to heterogeneous resonant photonic integrated circuits.

BACKGROUND

Integrated optical modulators have important applications in telecommunications and data-communications, as well as sensing. Optical intensity modulators generally enable imparting information onto laser light by modulating the intensity of an incident narrow-line (usually continuous-wave) laser signal. Relevant performance metrics for such modulators include modulation speed, sensitivity to the modulation drive signal and energy efficiency, extinction ratio (i.e., the ratio of the minimum to the maximum light intensity during a modulation cycle), and footprint.

Resonant-cavity-based optical modulators (e.g., microcavity or microring modulators) typically enhance sensitivity by allowing light to circulate the cavity, and pass through a region of modulated index, many times on resonance. Further, their typically small footprint reduces drive capacitance. Both effects contribute to greater energy efficiency.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe methods and apparatuses for utilizing heterogeneous resonant photonic integrated circuits (PICs). Said heterogeneous PICs comprise silicon and a non-silicon material. Said non-silicon material (herein referred to as "heterogeneous material") may comprise one of III-V material, optoelectronic polymer material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The optoelectronic phase modulation and absorption modulation effects of III-V based materials may be significantly higher than in silicon based materials, due to the direct bandgap at zone center in these materials. Thus, III-V semiconductor materials enable photonic operation with an increased efficiency at generating optical signals from electricity and converting optical signals back into electricity. The low optical loss and high quality oxides of silicon are thus combined with the electro-optic efficiency of III-V semiconductors in the heterogeneous optical devices described below; in embodiments of the invention, said heterogeneous devices utilize low loss heterogeneous optical waveguide transitions between the devices' heterogeneous and silicon-only waveguides.

Optoelectronic polymer materials may comprise various refractive indices and similarly exhibit low absorption, high transmission, efficient optoelectronic modulation, and low dispersion. Examples of optoelectronic polymer materials include cellulose acetate, biscarbonate polystyrene and polyarylcarbonate.

Crystal substrate materials provide heterogeneous PICs with a high linear electro-optic coefficient, low transmission loss, and stable physical and chemical properties. Said crystal substrate materials may comprise, for example, lithium niobate (LiNbO3) or lithium tantalate (LiTaO3).

Modulation effects in silicon are inferior to those in the above described III-V semiconductor quantum well material, crystal material, optoelectronic polymer material, or any other functionally equivalent material. Quantum-confined Stark effect (QCSE) based electroabsorption and electrorefraction are characterized by large changes in refractive index or absorption coefficient with applied electric field, high energy efficiency, low electric field, and high speed. In contrast, silicon-based thermal tuning is slow, and carrier-injection modulation cannot yield as large changes in refractive index or absorption coefficient.

Silicon-based resonant modulators using thermal modulation have a slow response, while those using carrier-injection effects require a high quality factor (Q-factor) or large cavities to enable a sufficiently large modulation. Large path length cavities and high Q-factor cavities both have reduced bandwidth compared to smaller path length/lower Q-factor cavities due to the time required for energy to dissipate in the resonator. Furthermore, both large path length and high Q-factor cavities necessarily have resonances which are unsuitably narrow for some applications, due to the strength of the resonance, and in the case of large path length cavities, to small Free Spectral Range (FSR). High Q-factor cavity resonators may also have power-dependent nonlinearity limiting the dynamic range of the signal with which they may be used. They may also require thermal control and feedback to keep a resonance wavelength correctly tuned, increasing the power consumption of the device.

Heterogeneous-integrated modulators in silicon PICs take advantage of efficient modulation in heterogeneous materials and of dense integration with other components of a heterogeneous-integrated PIC platform, but do not necessarily take advantage of the ability to create small, low-loss resonators in silicon to create a resonance-enhanced modulation effect. Resonance-enhanced modulation increases the efficiency of modulation while reducing the maximum-possible bandwidth (i.e., speed) and optical wavelength range of the effect. A well-designed resonant modulator can use the resonance to enhance efficiency without the resonant cavity's response time being the factor that ultimately limits modulation bandwidth, and without reducing the optical wavelength range beyond the desired wavelength band of operation.

Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1A:
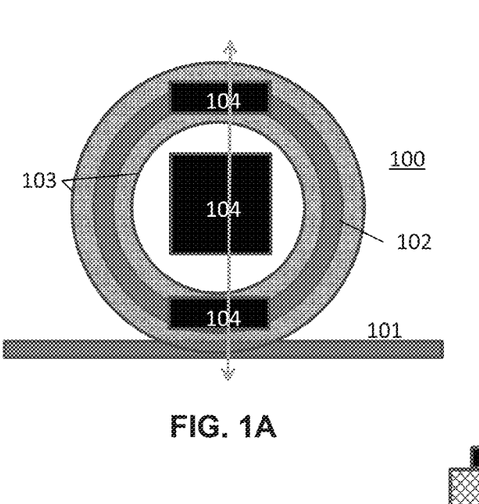
FIG. 1A and FIG. 1B are illustrations of a ring resonator heterogeneous modulator according to an embodiment of the invention.
Figure 1B:
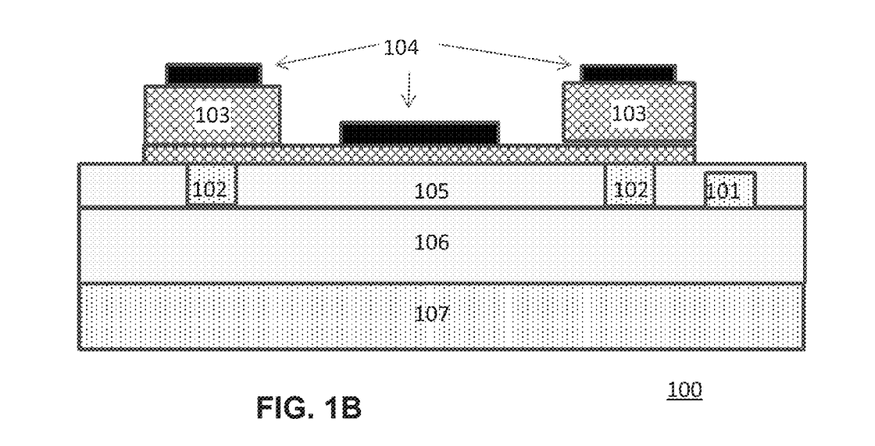

FIG. 1A and FIG. 1B are illustrations of a ring resonator heterogeneous (i.e., Si/heterogeneous material) modulator according to an embodiment of the invention. In this embodiment, modulator 100 includes a silicon-on-insulator (SOI) component (as shown in the cross sectional illustration of FIG. 1B), comprising substrate layer 107, cladding layer 105 and 106 (e.g., silicon dioxide cladding material, or alternatively air), and waveguides 101 and 102 (e.g., silicon waveguides). In this embodiment, waveguide 101 comprises an input/output (I/O) waveguide for modulator 100, while waveguide 102 comprises a ring waveguide (more clearly shown in the top-view illustration of FIG. 1A). Said waveguides may be of various widths (e.g., rib waveguides, or wire waveguides), to suit the intended functionality of an embodiment.

Modulator 100 further includes heterogeneous modulator material (e.g., III-V, polymer or crystal material) 103, and electrical contacts 104. In this embodiment, heterogeneous material 103 is bonded directly to the SOI component such that light is vertically coupled to/from the heterogeneous material from/to ring waveguide 102. In other embodiments, a cladding layer may separate said heterogeneous material and said SOI component. Thus embodiments of the invention do not require using materials grown on the same substrate. The limitation of fabricating both waveguides and modulators using materials grown on the same substrate reduces the flexibility with which materials may be chosen. In some embodiments, the resonator is formed partially due to index contrast with the heterogeneous material and its cladding.

Thus, modulator 100 may be used for modulating the intensity of light received from I/O waveguide 101. The high resonator quality factor (Q-factor) of heterogeneous material 103 allows for its absorption spectrum to change via an electrical field produced from an electrical difference applied to electrical contacts 104. Tapers or vertical couplers may be utilized to couple the optical mode of the resonator waveguide to a waveguide of the heterogeneous material.

Compared to prior art Si-only modulators, the use of heterogeneous material 103 increases the modulation efficiency per unit length of the optical mode versus the use of only the ring waveguide 102; in other words, Si-only resonant modulators would either require large path length cavities and high Q-factor cavities, more passes through its ring waveguide, and/or a stronger electrical field to match the performance and efficiency of modulator 100. In some embodiments, part of the resonator path is entirely contained in the heterogeneous material. In some embodiments, part of the resonator path is entirely contained in the silicon (i.e., passive) material.

In some embodiments, the above described I/O waveguide couples to a resonator at two different points, and uses a modulator placed between the points of coupling to change the coupling coefficient between the I/O waveguide and the resonator.

Thus, embodiments of the invention describe a modulator material heterogeneous-bonded over a resonator structure in a PIC to create a resonance-enhanced modulator. The resulting structure may utilize optimal materials and optimized fabrication processes to create a device with the desired properties. Materials and processes used may combine advantages such as high index contrast, low propagation loss, small resonator volume, efficient modulation combined with desired linearity or nonlinearity, and precisely fabricated evanescent and interferometric couplers. The materials may be combined flexibly to create a resonator with a wide range FSR, cavity Q-factor, and modulation efficiency, allowing for resonance enhanced modulators according to embodiments of the invention to be designed optimally for a range of requirements. Heterogeneous integration allows dense integration in a PIC with silicon passives and various heterogeneous-enabled devices such as other modulators, detectors, semiconductor optical amplifiers (SOAs), and lasers.

Figure 2:
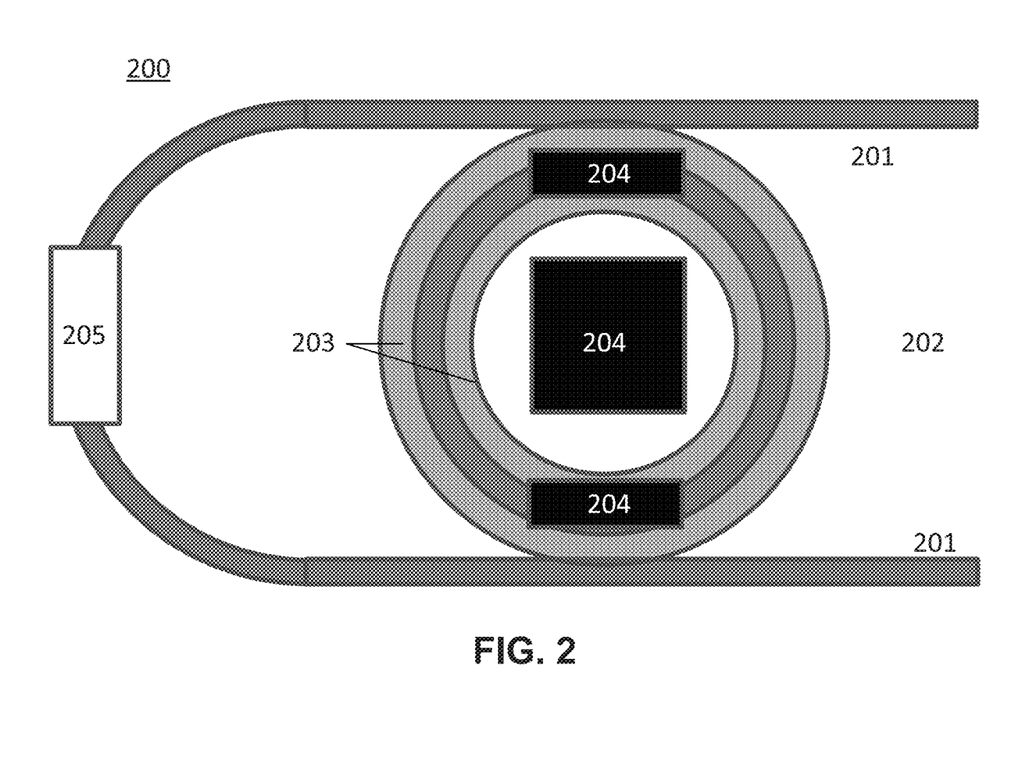
FIG. 2 is an illustration of a ring resonator heterogeneous modulator with tunable coupling according to an embodiment of the invention.

FIG. 2 is an illustration of a ring resonator heterogeneous modulator with tunable coupling according to an embodiment of the invention. In this embodiment, modulator 200 includes (similar to modulator 100 of FIGS. 1A and 1B) I/O waveguide 201 and ring waveguide 202 formed from silicon material of an SOI slab, heterogeneous modulator material 203 disposed above said silicon material, and electrical contacts 204.

Heterogeneous PICs, according to embodiments of the invention, allow for silicon-based optical components to be easily integrated with the silicon layers of Heterogeneous PICs. With regards to the cost and size of an optical modulator, silicon materials are easily processed with current techniques, high quality silicon materials are readily available for reasonable a cost, and complex VLSI silicon electronic circuits are readily available. However, as discussed above, silicon-based modulators are not as efficient at light intensity or phase modulation as their heterogeneous based counterparts. In this embodiment, modulator 200 further includes modulator 205 for adjusting the coupling between I/O waveguide 201 and ring waveguide 202. In this embodiment, modulator 205 allows for adjusting the modulator operating voltage swing, bias voltage, and bandwidth, and it is formed from silicon as the high speed modulation effect of the heterogeneous material (e.g., heterogeneous material 203) is not necessary for this component.

Figure 3:
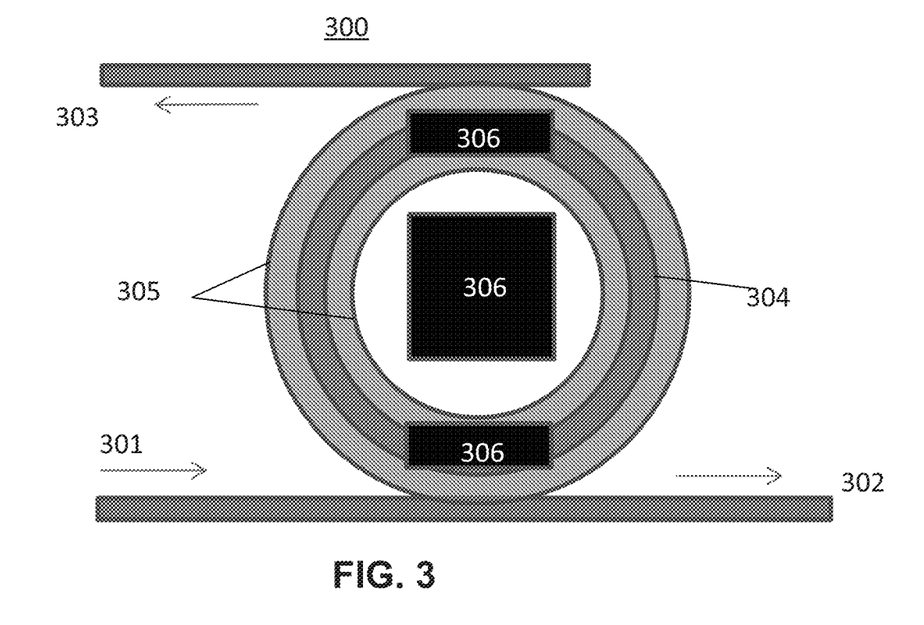
FIG. 3 is an illustration of an add-drop filter employing a resonant modulator according to an embodiment of the invention.

FIG. 3 is an illustration of an add-drop filter employing a resonant modulator according to an embodiment of the invention. An add-drop filter is a device that is capable of adding or removing wavelengths of light from a broader optical signal that is carried via an input waveguide.

In this embodiment, add-drop filter 300 includes ring waveguide 304, heterogeneous modulator material 305 and electrical contacts 306. Said ring waveguide is formed from silicon material (similar to the devices of FIG. 1A/1B and FIG. 2).

Add-drop filter 300 further includes input port 301, drop port 303 and through port 302. Said filter is capable of adding or dropping a wavelength of light to light received from input port 301 to be output via through port 302; a wavelength of light received from input port 301 may be "dropped" and routed to through port 303. The high modulation efficiency of heterogeneous material 305 allows for broader spectral bandwidth of the add/drop filtering effect to be achieved, compared to prior art Si-only based devices. Add-drop filter 300 may be connected to multiple devices for separating different wavelengths, for creating a tunable transmission filter, etc.

Figure 4:
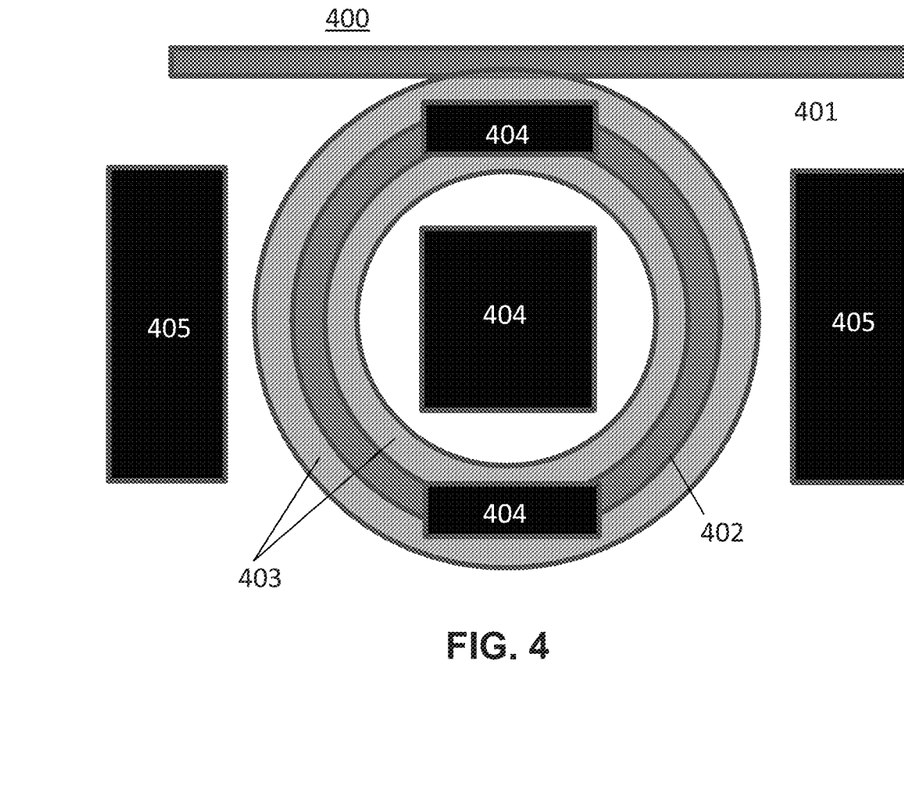
FIG. 4 is an illustration of a heterogeneous modulator on a silicon-on-insulator substrate with a thermal modulator according to an embodiment of the invention.

FIG. 4 is an illustration of a heterogeneous modulator on an SOI substrate with a thermal modulator according to an embodiment of the invention. In this embodiment, modulator 400 includes I/O waveguide 401 and ring waveguide 402 formed from silicon material of an SOI slab, heterogeneous modulator material 403 disposed above said silicon material, and electrical contacts 404 (functioning similarly as described in the above example embodiments).

In this embodiment, modulator 400 further includes thermal modulator electrical contacts 405. Said thermal modulator electrical contacts may inject carriers through the silicon underneath the heterogeneous material 403 (e.g., for devices that utilize rib waveguides for waveguide 402). Thermal tuning allows for a cavity's resonance wavelength to be tuned such that the heterogeneous modulator can perform high speed modulation of a signal at the resonance frequency selected via thermal tuning.

If a cavity can be designed with sufficiently broad resonances, thermal tuning may not be necessary. If coupling between a waveguide and resonator is accomplished with a vertical directional coupler utilizing a silicon PIC and a waveguide in heterogeneous material, performance of the design may be improved due to the improved dimensional tolerance of planar deposited or epitaxially grown layers with respect to separations between lithographically defined etched waveguides. With respect to these non-resonance-enhanced heterogeneous devices, drive voltage and power dissipation may be reduced. Though the use of a resonator places a fundamental limitation on frequency bandwidth and signaling bandwidth, embodiments of the invention mitigate these effects such that they need not reduce device performance or compromise an embodiment's ability to meet desired system requirements.

Figure 5:
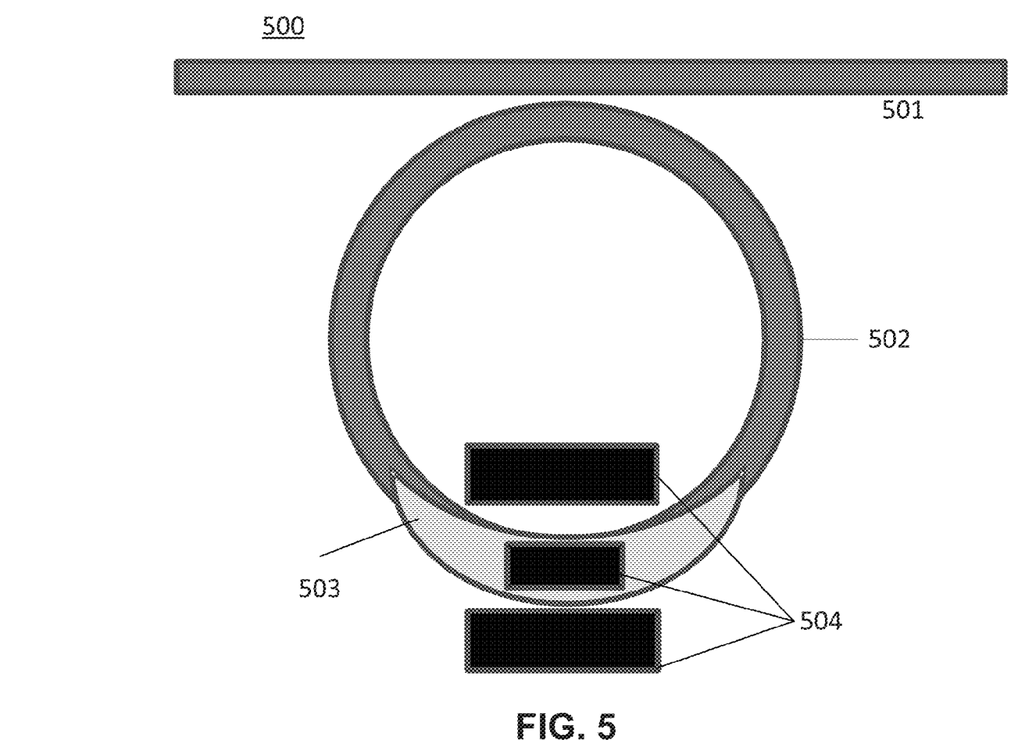
FIG. 5 is an illustration of a heterogeneous modulator according to an embodiment of the invention.

FIG. 5 is an illustration of a heterogeneous modulator according to an embodiment of the invention. In this embodiment, modulator 500 includes I/O waveguide 501 and ring waveguide 502 formed from silicon material of an SOI slab, heterogeneous modulator material 503 disposed above said silicon material, and electrical contacts 504 (functioning similarly to the above described example embodiments). In this embodiment, heterogeneous modulator material 503 only interacts with a portion of ring waveguide 502. Thus, for embodiments of the invention, it is not necessary for heterogeneous material to completely cover the silicon waveguide of modulator 500 in order for the device to have improved resonance capabilities (compared to prior art Si-based solutions).

Figure 6:
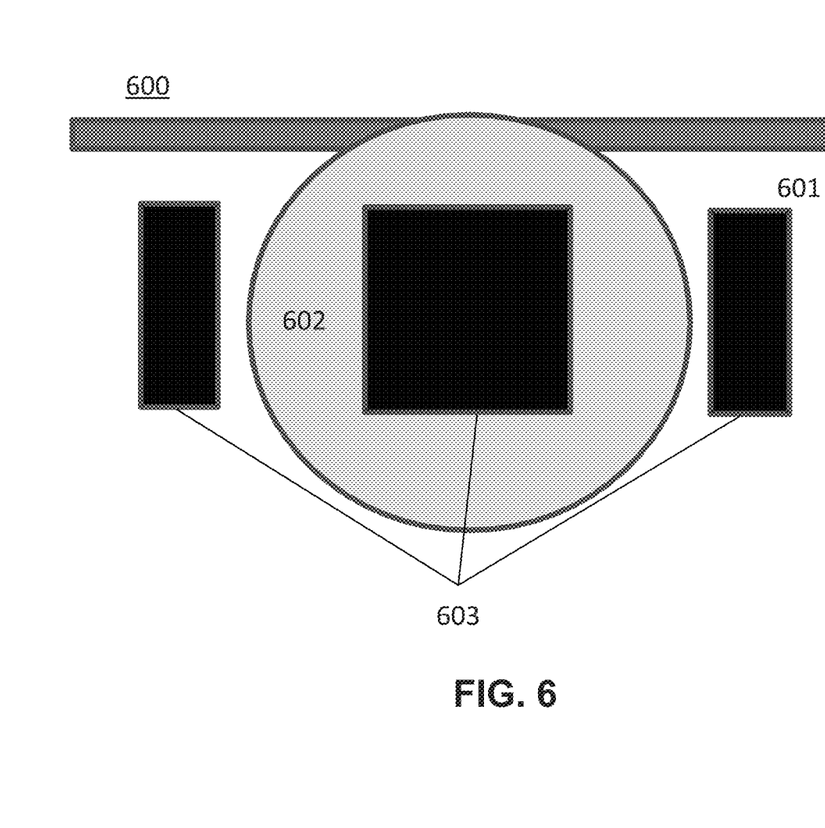
FIG. 6 is an illustration of a heterogeneous modulator with vertical coupling between its I/O waveguide and resonator.

FIG. 6 is an illustration of a heterogeneous modulator with vertical coupling between its I/O waveguide and resonator. In this embodiment, modulator 600 includes I/O waveguide 601, heterogeneous resonant material 602, and modulator electrical contacts 603. In this embodiment, said heterogeneous resonant material (which may comprise, for example, a disc or a ring) is vertically coupled with I/O waveguide 601. Said coupling may occur via a silicon dioxide (SiO2) gap (not shown) for evanescent coupling. Thus, as opposed to the other example embodiments discussed above, no ring waveguide is necessary in this embodiment; resonance is accomplished completely within heterogeneous material 602.

Figure 7A:
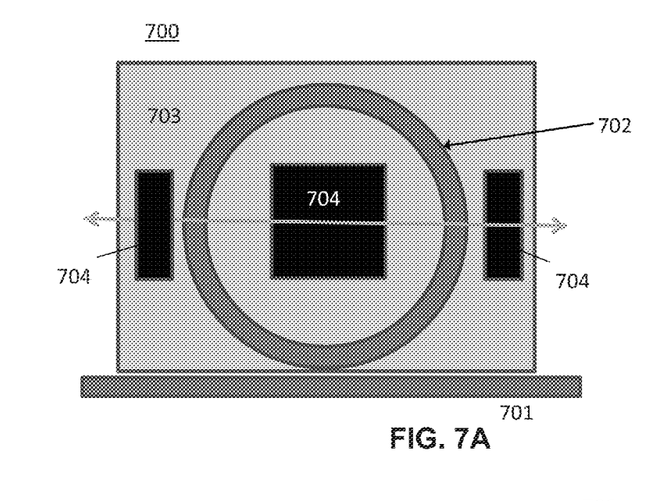
FIG. 7A and FIG. 7B are illustrations of a heterogeneous resonant modulator having resonator path defined by features in silicon according to an embodiment of the invention.
Figure 7B:
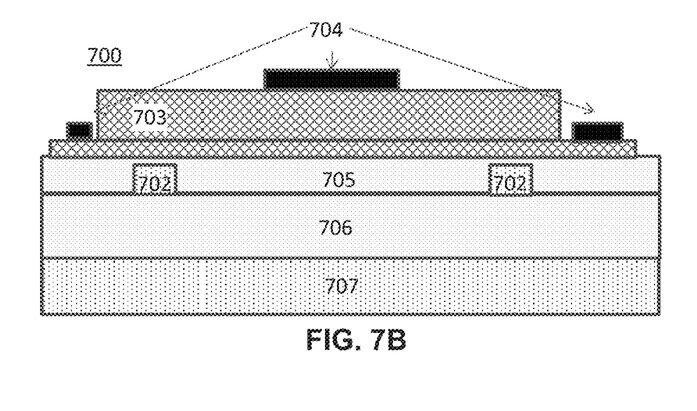

FIG. 7A and FIG. 7B are illustrations of a heterogeneous resonant modulator having resonator path defined by features in silicon according to an embodiment of the invention. In this embodiment, modulator 700 includes I/O waveguide 701 (as seen on the top-view illustration of FIG. 7A) and ring waveguide 702 formed from silicon material of an SOI slab (having oxide layer 706 and substrate layer 707, as seen in the cross-sectional illustration of FIG. 7B), heterogeneous modulator material 703 disposed above said silicon material, and electrical contacts 704.

In this embodiment the heterogeneous, the path of the resonant mode propagation in the waveguide is determined by the ring waveguide 702 and not by lithographic features in the heterogeneous material 703. The optical mode of said modulator material penetrates into heterogeneous material, but does not rely on its edges to define the path along the ring. Silicon etching performs the confining of the optical mode, as the optical mode of modulator 700 resides mostly in the silicon components of the device (i.e., ring waveguide 702).

Figure 8:
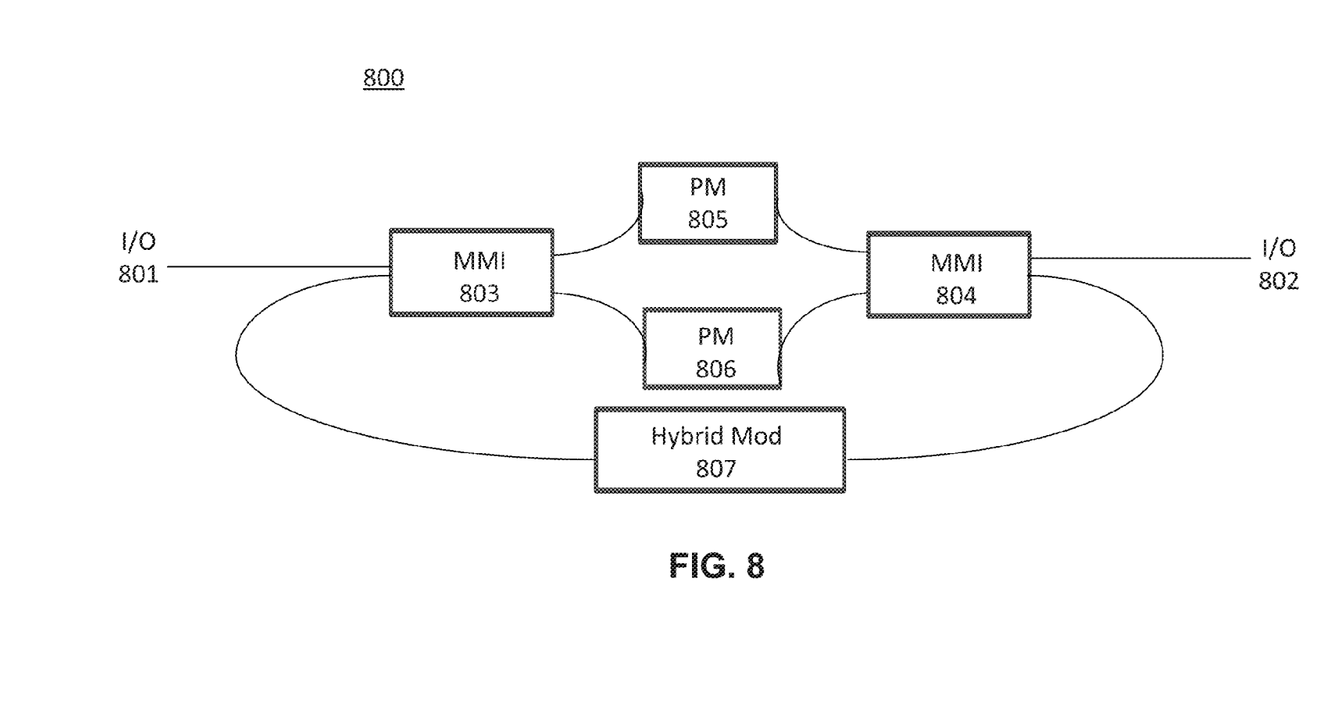
FIG. 8 is an illustration of a heterogeneous resonant modulator utilizing feedback between ports of silicon-based multimode interference devices to achieve optical resonance according to an embodiment of the invention.

FIG. 8 is an illustration of a heterogeneous resonant modulator utilizing feedback between ports of silicon-based multimode interference devices (MMIs) to achieve optical resonance according to an embodiment of the invention.

In this embodiment, modulator 800 includes I/O waveguides 801 and 802, multimode interference (MMI) devices 803 and 804, phase modulators 805 and 806, and heterogeneous modulator 807. Said MMI devices provide optical feedback for said heterogeneous modulator causing the resonance effect. In this embodiment, MMI devices 803 and 804 are fabricated from passive silicon, while heterogeneous modulator 807 may comprise heterogeneous materials as described above in the example embodiments. Phase modulators 805 and 806 may comprise either passive silicon material, or heterogeneous material.

Using the heterogeneous integration silicon PIC platform described above allows dense integration with other passives and actives with optimized properties. An optimal modulator material with optimized properties may be used. An ultra small resonator cavity with large FSR may have strong modulation which reduces the cavity Q and broadens the resonance. This allows resonance bandwidth that may be broad enough to match a wavelength division multiplexer (WDM) channel. Due to the high efficiency of modulator materials that may be heterogeneous-integrated to a PIC, it is possible to use smaller resonators than those used in previous resonance-enhanced modulators in silicon PICs such as photonic crystal defect modes or distributed Bragg reflector (DBR) resonant cavities.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures may vary in size and dimensions.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. An optical device comprising:
   a modulator comprising:
      a silicon semiconductor slab including an input/output (I/O) waveguide;
      a resonator structure including a waveguide to receive light from the I/O waveguide;
      a non-silicon slab, disposed over the silicon semiconductor slab, wherein an optical mode of the non-silicon slab overlaps an optical mode of the resonator; and
      electrical contacts disposed over one or more of the silicon and non-silicon slabs, wherein an absorption coefficient of the optical mode in the optical device increases based on an electrical difference applied to the electrical contacts.

2. The optical device of claim 1, wherein the non-silicon slab of the modulator comprises III-V semiconductor material.

3. The optical device of claim 1, wherein the non-silicon slab comprises an optoelectronic polymer material.

4. The optical device of claim 1, wherein the non-silicon semiconductor slab comprises crystal substrate material.

5. The optical device of claim 1, wherein the resonator structure is formed in the silicon semiconductor slab and the waveguide of the resonator comprises a ring waveguide.

6. The optical device of claim 1, wherein the resonator structure comprises a disc resonator formed from the non-silicon semiconductor slab and disposed over the I/O waveguide of the silicon semiconductor slab, wherein the light received from the I/O waveguide of the silicon semiconductor slab is vertically coupled into the disc resonator.

7. The optical device of claim 1, wherein an optical cross section along a length of the resonator is constant.

8. The optical device of claim 1, wherein an optical cross section along a length of the resonator is not constant.

9. The optical device of claim 5, further comprising:
   tapers to couple the optical mode of the resonator waveguide to a waveguide of the non-silicon slab.

10. The optical device of claim 5, further comprising:
    vertical directional couplers to couple the optical mode of the resonator waveguide to a waveguide of the non-silicon semiconductor slab.

11. The optical device of claim 5, wherein the non-silicon slab partially, but not completely, overlaps the resonator structure.

12. The optical device of claim 1, wherein the device modulates a resonant frequency back and forth around a carrier wavelength for both amplitude and phase modulation.

13. The optical device of claim 1, further comprising:
    a thermal modulator for resistive heating to thermally tune a wavelength of light modulated by the device.

14. The optical device of claim 1, wherein the resonance structure further includes:
    one or more multimode interference (MMI) regions coupled to the I/O waveguide to provide optical feedback to resonance structure.

15. The optical device of claim 14, wherein the resonance structure further includes:
    one or more phase modulators coupled to the one or more MMI regions.

16. A system comprising:
    a first optical device formed from silicon semiconductor material; and
    a second optical device comprising a modulator:
       a silicon region including an input waveguide optically coupled to the first optical device;
       a resonator structure including a waveguide to receive light from the input waveguide;
       a non-silicon region, disposed over the silicon region, wherein an optical mode of the non-silicon region overlaps an optical mode of the resonator; and
       electrical contacts disposed over one or more of the silicon and non-silicon regions, wherein an absorption coefficient the optical waveguides of the second optical device increases based on an electrical difference applied to the electrical contacts.

17. The system of claim 16, wherein the resonator structure of the second optical device is formed in the silicon semiconductor slab and the waveguide of the resonator comprises a ring waveguide.

18. The system of claim 16, wherein the resonator structure of the second optical device comprises a disc resonator formed from the non-silicon region and disposed over the input waveguide of silicon region, wherein the light received from the input waveguide of the silicon region is vertically coupled into the disc resonator.

19. The system of claim 16, wherein an optical cross section along a length of the resonator of the second optical device is constant.

20. The system of claim 16, wherein an optical cross section along a length of the resonator of the second optical device is not constant.

21. The system of claim 17, the second optical device further comprising:
    tapers to couple the optical mode of the resonator waveguide to a waveguide of the non-silicon region.

22. The system of claim 17, the second optical device further comprising:
    vertical directional couplers to couple the optical mode of the resonator waveguide to a waveguide of the non-silicon region.

23. The system of claim 17, wherein the non-silicon region of the second optical device partially, but not completely, overlaps the resonator structure.

24. The system of claim 16, wherein the second optical device modulates a resonant frequency back and forth around a carrier wavelength for both amplitude and phase modulation.

25. The system of claim 16, the second optical device further comprising:
    a thermal modulator for resistive heating to thermally tune a wavelength of light modulated by the device.

26. The system of claim 16, wherein the non-silicon region comprises one of III-V semiconductor material, optoelectronic polymer material, and crystal substrate material.

* * * * *